United States Patent [19]

Forkert et al.

[11] Patent Number: 4,831,866

[45] Date of Patent: May 23, 1989

[54] AUTOMATIC METER PROVING AND CALIBRATION SYSTEM

[75] Inventors: Maurice J. Forkert, Fort Wayne; William D. Key, Leo, both of Ind.

[73] Assignee: Tokheim Corporation, Fort Wayne, Ind.

[21] Appl. No.: 118,552

[22] Filed: Nov. 9, 1987

[51] Int. Cl.[4] .......................................... G01F 25/00
[52] U.S. Cl. ..................................... 73/3; 364/571.02
[58] Field of Search .............. 73/3; 364/571; 365/510; 222/23

[56] References Cited

U.S. PATENT DOCUMENTS

| | | | |
|---|---|---|---|
| 3,120,118 | 2/1964 | Boyle | 73/3 |
| 3,254,523 | 6/1966 | Fisher et al. | 73/3 |
| 3,421,360 | 1/1969 | Luse et al. | 73/3 |
| 3,457,768 | 7/1969 | Jasek | 73/3 |
| 3,580,045 | 5/1971 | Pfrehm | 73/3 |
| 3,610,898 | 10/1971 | Yamamoto et al. | 235/151 |
| 3,657,925 | 4/1972 | Gross | 73/239 |
| 3,813,527 | 5/1974 | Langston | 235/151 |
| 3,845,848 | 11/1974 | Robbins | 194/13 |
| 3,924,445 | 12/1975 | Konomi et al. | 73/3 |
| 3,958,443 | 5/1976 | Berrettini | 73/3 |
| 4,009,800 | 3/1977 | Loy et al. | 222/28 |
| 4,253,156 | 2/1981 | Lisle et al. | 364/571 |
| 4,307,601 | 12/1981 | Jackson | 73/3 |
| 4,328,697 | 5/1982 | Tumber et al. | 73/3 |
| 4,331,262 | 5/1982 | Snyder et al. | 222/14 |
| 4,358,947 | 11/1982 | Greene et al. | 73/3 |
| 4,365,503 | 12/1982 | Ho et al. | 73/3 |
| 4,372,166 | 2/1983 | Loveland | 73/861 |
| 4,386,716 | 6/1983 | Buck | 222/37 |
| 4,481,805 | 11/1984 | Dobesh | 73/3 |
| 4,566,307 | 6/1986 | Boykin | 73/3 |
| 4,606,218 | 9/1986 | Chisman, III | 73/3 |
| 4,619,134 | 10/1986 | Bohm et al. | 73/3 |
| 4,628,724 | 12/1986 | Maurer | 73/3 |
| 4,674,316 | 6/1987 | Albrecht | 73/3 |

FOREIGN PATENT DOCUMENTS 2094521  9/1982  United Kingdom ................ 364/510

OTHER PUBLICATIONS

RCA Solid State Databook SSD-250C.
Service Parts Manual for TCS Series Dispensers.

Primary Examiner—Stewart J. Levy
Assistant Examiner—Robert R. Raevis
Attorney, Agent, or Firm—Jeffers, Hoffman & Niewyk

[57] ABSTRACT

An apparatus for and method of calibrating a fluid meter having an output transformable into a series of digital pulses, where each pulse represents a certain volume of liquid through the meter that changes as a result of meter wear and/or component failure. A microprocessor controlled bidirectional prover tube having a calibrated volume is provided in the dispenser housing for operation once during each of a predetermined number of dispensing events. The digital pulses are accumulated during dispensation of the calibrated volume of fluid through the prover, and a calibration factor is automatically calculated and applied to the digital pulses prior to being supplied to an electronic display unit for accurate computation and display of the volume of liquid through the meter. A four-port, two-position valve is actuated prior to the beginning of each dispensing event by the microprocessor to reverse flow through the prover tube.

36 Claims, 5 Drawing Sheets

AUTOMATIC METER PROVING AND CALIBRATION SYSTEM

BACKGROUND OF THE INVENTION

The present invention relates generally to liquid dispensing devices and methods, and more particularly to such devices and methods wherein a mechanical flow meter is used to measure the volume of liquid dispensed.

More particularly, the present invention relates to a liquid dispenser incorporating a mechanical flow meter having a rotating mechanical output responsive to the passage of liquid through the meter. In such a meter, each mechanical rotation of a rotary output shaft ordinarily corresponds to a specific volume of dispensed liquid. The meter output is typically connected to a pulser which generates a fixed number of pulses per revolution of the output shaft. The pulses are then processed by conventional electronic data display means for indicating data such as quantity of liquid dispensed, price per unit, and total price of the sale.

A problem arises in the aforementioned dispenser in that the volume of liquid through a mechanical flow meter corresponding to a given rotational output of the meter varies to some extent due to variations in dimensional parameters, as well as mechanical wear and leakage of meter components. As a result, the volume of liquid dispensed as reflected by the data display means does not always correspond to the actual volume of liquid flowing through the meter. Accordingly, it is necessary to calibrate the flow meter from time to time to insure that the dispensed liquid volume reflected by the data display means corresponds as nearly as possible to the volume of liquid dispensed through the flow meter.

In the past, meters in liquid dispensing devices have been provided with means to change the displacement thereof so that the volume of liquid dispensed per rotation of the meter shaft corresponds in fixed relation to the number of delivery pulses produced and, therefore, the volume displayed by the data display means. This procedure involving mechanical calibration of the meter to alter the meter output entails not only the expense of a variable displacement meter, but also requires an attendant to manually perform multiple dispensing operations and make adjustments to the meter to arrive at the proper setting.

Another method of calibrating a meter, used particularly in pipeline applications, involves the use of large calibration barrels and barrel meter provers. The barrels are either permanently connected directly to the pipeline by means of elaborate valving, or are carried on a vehicle and temporarily attached inline of the flow of the pipeline, in order to monitor the output of the flow meter over dispensation of a fixed volume of liquid. A meter factor is then manually calculated and manually applied to all indicated readings from the meter.

An electronic register/calibrator apparatus is commercially available for use in a bulk flow application and includes a meter and a pulser, wherein a calibration factor is manually entered on thumbwheel switches for use to modify the pulser output prior to its use by the electronic register to reflect the accumulated volume of liquid flowing through the meter. Similar to the previously described procedure of mechanically calibrating the meter in a liquid dispensing device, calculation of the manually entered correction factor for use by the electronic register also requires an attendant to perform calibrated flow measurements and manually calculate the appropriate correction factor to be entered.

The described known methods of calibrating a mechanical flow meter to correct for variations in the volume of liquid passing through the meter per given meter output, all exhibit a common disadvantage of requiring human input or supervision. For instance, for a liquid dispensing device an attendant must manually perform dispensing operations and mechanically calibrate the meter by changing its displacement. In bulk flow metering, an operator must calculate a meter correction factor for entry into the electronic register apparatus or for application to volume readings taken therefrom. Because state and federal weights and measures agencies require performance of calibration tests at regular intervals, a substantial investment of time and expense is involved in maintaining a corps of trained personnel to travel to metering and liquid dispenser installations to perform such tests.

Another disadvantage of known meter calibration methods is that each time a meter is replaced or repaired, the time and expense of conducting a conventional meter calibration test is incurred.

A further disadvantage exists in that because current methods of meter calibration are so expensive and cumbersome, tests are not performed as frequently as is desirable.

A still further disadvantage of meter calibration methods involving the calculation of meter correction factors is that, as new factors are calculated, a records problem is created in maintaining the most current data.

Yet another disadvantage of known dispenser meter calibration methods is the need for calibration equipment external to the dispenser housing.

Several disadvantages are associated specifically with the use of large calibration barrels. For example, the barrels must be transported between installations, typically in the cargo compartment of a truck. Additionally, the barrel meter provers must be connected in some way to the liquid flow metering installation. Furthermore, manually actuable valving is typically employed in the aforementioned calibration barrels to provide bidirectional flow capabilities.

SUMMARY OF THE INVENTION

The present invention overcomes the aforementioned problems and disadvantages of prior art meter proving systems by providing an apparatus for and method of calibrating a mechanical flow meter used in a liquid dispenser, wherein a calibration factor for correcting the number of delivery pulses generated by the meter and pulser is automatically calculated during normal dispensing operation of the liquid dispenser apparatus.

More specifically, the present invention provides for the dispensation of a calibrated volume of liquid during which a plurality of delivery pulses in direct proportion to the volume of liquid passed through the meter are accumulated and compared to a constant value representing the number of pulses desired as an input for electronic data display means to reflect dispensation of the calibrated volume. A calibration factor is automatically calculated and used to modify the delivery pulses for use as input pulses to the data display means in order to accurately reflect the volume of liquid being dispensed.

A primary advantage of a liquid dispenser apparatus having meter calibration in accordance with the present invention is that meter calibration is performed automatically without human input or supervision.

Another advantage of the present invention is that meter calibration is performed automatically during normal dispensing operations of the liquid dispenser apparatus.

Still another advantage of a liquid dispenser apparatus according to the present invention is that a flow meter becomes virtually self-calibrating over the life of the meter.

A further advantage of the present invention is that the need is eliminated for expensive meters having mechanical variable displacement.

Yet another advantage of the present invention is that meter calibration in a liquid dispensing application is performed more frequently at less expense.

A still further advantage of the present invention is that meter calibration is less cumbersome and requires less space for implementation.

A yet further advantage of the present invention is that calibration accuracy is improved by the provision of multiple runs of a single calibrated volume.

The invention, in one form thereof, provides a liquid dispenser apparatus comprising a liquid volume measuring means for providing a raw output signal in proportion to a volume of liquid flowing therethrough. The dispenser apparatus also includes means for indicating the start and finish of flow of a calibrated volume of liquid through the liquid measuring means. Additionally, signal measuring means are provided for measuring the raw output signal during flow of the calibrated volume of liquid. The signal measuring means are responsive to the means for indicating the start and finish of the flow of the calibrated volume. Signal modifying means, responsive to the raw output signal measurement, is provided for modifying the raw output signal as a function of the calibrated volume and the raw output signal measurement. Accordingly, the signal modifying means provides a calibrated signal.

The invention further provides, in one form thereof, a liquid dispenser apparatus comprising a liquid measuring means for providing an output signal in correlation with a volume of dispensed liquid. The output signal is variable due to variations of the measuring means. The liquid dispenser apparatus further includes data display means for reflecting the volume of liquid dispensed. The data display means is responsive to an input signal. Also included is calibration means for determining a correction factor by which to modify the output signal to generate the input signal to the data display means. The correction factor is automatically determined at predetermined dispenser operating intervals to provide correction of the variable output signal. Accordingly, the data display means accurately reflects the volume of liquid dispensed despite the variations of the liquid measuring means.

The invention further provides, in one form thereof, a method of calibrating a measuring means in a liquid dispensing apparatus. More specifically, the liquid dispensing apparatus includes, within a housing, mechanical flow measuring means for producing a rotary output in response to the passage of liquid therethrough. Connected to the rotary output of the measuring means is a delivery pulser means for producing a plurality of output delivery pulses in proportion to the volume of liquid dispensed. Furthermore, the dispensing apparatus includes data display means responsive to input pulses for reflecting a volume of liquid dispensed in direct proportion to the number of input pulses received. The proportion of output delivery pulses produced by the pulser means to the volume of the liquid dispensed varies according to mechanical wear and variations of the measuring means. Therefore, the calibration method is directed to calibrating the measuring means to compensate for the variations in the proportion of output delivery pulses produced to the volume of liquid dispensed. The calibration method includes, in one form thereof, the step of providing indicating means within the housing for indicating the initiation of and completion of dispensation of a calibrated volume of liquid. The number of input pulses necessary for the data display means to reflect the calibrated volume is a known constant. A further step is accumulating the output delivery pulses during dispensation of liquid beginning with the initiation indication and ending with the completion indication. A further step provides for comparing the known constant to the accumulation of the delivery pulses to determine a meter correction factor. Finally, the method provides for modifying the output delivery pulses by the meter correction factor for use as input pulses to the data display means.

The invention further provides, in one form thereof, a liquid dispenser apparatus comprising a manually operable nozzle, a valve, a pump, a mechanical flow meter, delivery pulser, value display, calibration means, an accumulator, and computer. The valve controls dispensing of liquid and the pump supplies a flow of liquid to the valve. The meter produces a meter output in proportion to the dispensed volume of liquid passing through the meter, whereby the dispensed volume of liquid for a given meter output is variable due to mechanical wear and variations of the flow meter. The pulser is responsive to the meter output of the flow meter, and produces a plurality of output delivery pulses in direct proportion to the meter output. The value display is responsive to input pulses for reflecting a volume value in direct proportion to the number of input pulses received. This proportion represents a display constant. The calibration means includes a calibration chamber of a predetermined calibrated volume for use in indicating dispensation of a volume of liquid substantially equal to the calibrated volume. The accumulator accumulates the output delivery pulses during dispensation of the volume of liquid substantially equal to the calibrated volume. The computer automatically computes a calibration factor based upon the number of delivery pulses accumulated during dispensation of the calibrated volume, the display constant of the value display, and the calibrated volume. More specifically, the calibration factor is the raw number of delivery pulses accumulated during dispensation of the calibrated volume divided into the desired number of delivery pulses required by the value display to display the calibrated volume. The output delivery pulses are then modified by the calibration factor before being supplied as input pulses to the value display. In this way, the meter is automatically compensated for variations in the meter output caused by mechanical wear and variations of the flow meter. Accordingly, the value display reflects an accurate value for the volume of liquid dispensed.

The invention still further provides, in one form thereof, a liquid fuel dispensing apparatus comprising a housing. Provided within the housing are liquid measuring means and proving means for proving the amount of fuel dispensed in a predetermined number of dispensing operations of the apparatus. The liquid fuel dispenser also includes display means for displaying the volume of dispensed fuel and means for calibrating the display means based on the proving means.

DETAILED DESCRIPTION OF A PREFERRED EMBODIMENT

Figure 1:
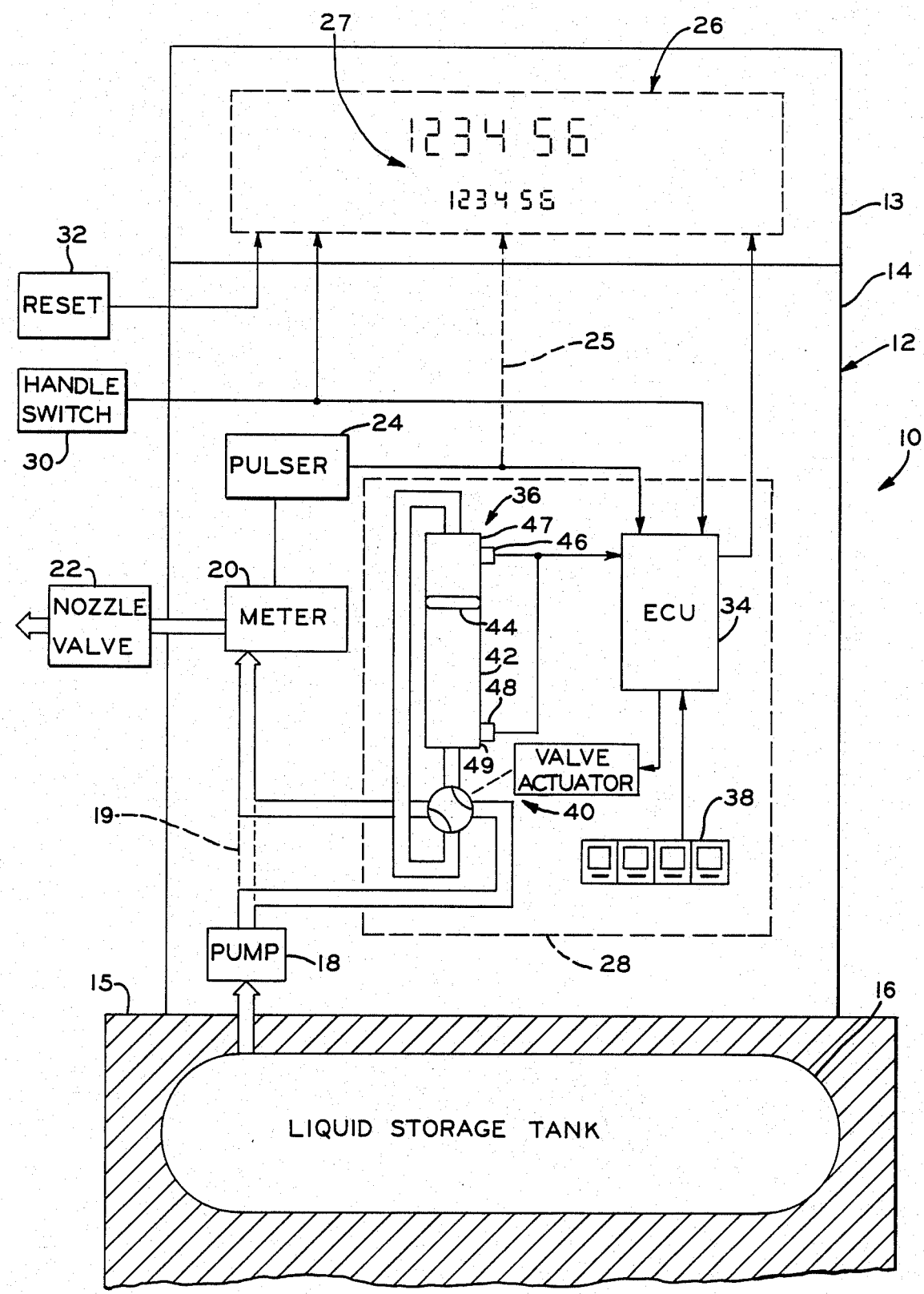
FIG. 1 is a diagrammatic representation of a liquid dispensing system to which the present invention is applicable, including a block diagram of the meter proving and calibration system of the present invention.

Referring now to the drawings, and in particular to FIG. 1, there is shown a liquid fuel dispenser 10 to which the present invention is applicable. More specifically, dispenser 10 includes a housing 12 comprising an upper portion 13 and a lower portion 14. Housing 12 is situated on a base 15 beneath which is located a liquid storage tank 16. Within housing 12 are located a liquid pump 18 and a mechanical liquid flow meter 20. In the usual manner of operating dispenser 10 in the absence of the present invention, pump 18 pumps liquid from tank 16 to meter 20 through conduit length 19. From meter 20, the liquid is delivered to a nozzle valve 22 located externally of housing 12. Actuation of valve 22 controls dispensation of the liquid from dispenser 10. In the preferred embodiment, liquid fuel dispenser 10 is a TCS Model 324 dispenser manufactured by Tokheim Corporation, Fort Wayne, Ind. In such a dispenser, pump 18 comprises a rotary pump and air separator Model 855, and meter 20 comprises a positive displacement type meter Model 898-K, both manufactured by Tokheim Corporation. Rotary pump 18 is operated by a conventional electric motor (not shown).

A pulser 24, such as a conventional pulse generator, is connected to the rotary shaft output of meter 20 and produces a plurality of output delivery pulses in direct proportion to the volume of liquid dispensed through meter 20. In the absence of the present invention, the output pulses of pulser 24 are delivered directly to an electronic data display unit 26 through a conductor 25. Display unit 26 processes the pulses and incorporates a digital display 27, whereby display unit 26 reflects the volume of liquid dispensed through meter 20 on digital display 27. Display unit 26 will typically also include price information. In the preferred embodiment, pulser 24 comprises a pulser assembly Model 88D and data display unit 26 comprises an Electrical Component and Power Supply Assembly for use with TCS Series Dispensers, both manufactured by Tokheim Corporation.

A handle switch 30 is manually operable, such as by lifting a handle, to initiate a new dispensing event. A reset switch 32, located on the housing or at a remote location therefrom, is operable by an attendant to reset display unit 26 and to enable initiation of a new dispensing event by operation of handle switch 30.

The present invention alleviates the need for manually adjusting the displacement of the flow meter in order to provide calibrated pulses to electronic data display means 26. In the illustrated embodiment of the invention, as depicted in FIG. 1, an automatic meter proving and calibration system 28 may be incorporated into fuel dispenser 10 with a minimal amount of modification to existing components. Specifically, conduit length 19 through which liquid is ordinarily pumped is disconnected and the pumped liquid is instead channeled through system 28. Likewise, the direct connection normally present between pulser 24 and display unit 26 is removed, and pulser 24 instead delivers raw pulses directly to system 28 for modification before delivery to display unit 26. System 28 also requires an input from handle switch 30.

Automatic meter proving and calibration system 28, in accordance with one form of the present invention, includes an electronic control unit (ECU) 34, a prover assembly 36, a set of thumbwheel switches 38, and valving means, such as a conventional solenoid actuated four-way, two-position valve 40. When system 28 is installed, valve 40 is connected between pump 18 and meter 20 within housing 12. Valve 40 is electrically controlled by ECU 34 to introduce prover assembly 36 in series with the flow of liquid from pump 18 to meter 20. In the preferred embodiment as illustrated, valve 40 provides means for reversing the flow of liquid through prover assembly 36 without changing direction of flow through meter 20.

Prover assembly 36 is a conventional volumetric tube prover comprising a calibrated barrel in the form of a cylindrical tube 42 having a plunger or piston member 44 movable therein from one end of tube 42 to the other in response to bidirectional flow of liquid through tube 42 as controlled by valve 40. A pair of spaced apart sensors, such as proximity switches 46 and 48, provide a gate signal to ECU 34 whenever piston or plunger 44 achieves a position adjacent to either of switches 46 and 48.

In one form of the invention, switches 46 and 48 are positioned on tube 42 at a distance from one another so as to establish a predetermined calibrated volume of liquid between the positions wherein plunger 44 is adjacent one switch 46 and the other switch 48. In another form of the invention, thumbwheel switches 38 provide binary coded decimal (BCD) information to ECU 34 indicative of an experimentally determined volume of liquid in tube 42 between switches 46 and 48.

Figure 6:
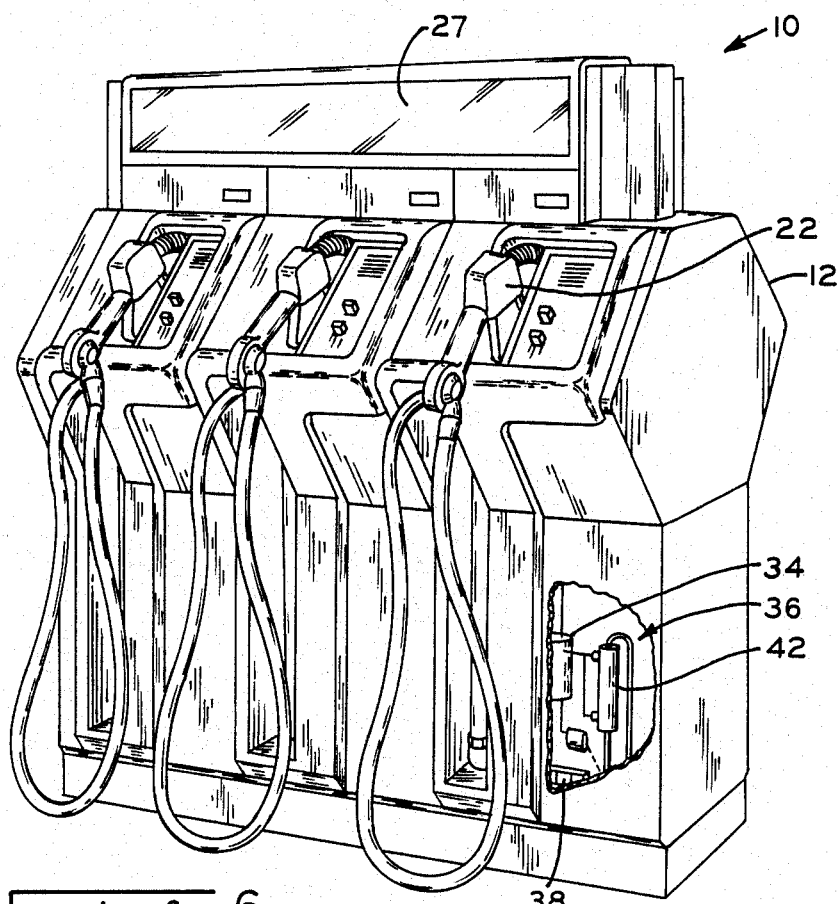
FIG. 6 is a fragmentary perspective view of a liquid fuel dispensing apparatus according to the present invention, particularly showing a prover assembly within the dispenser housing.
Figure 5:
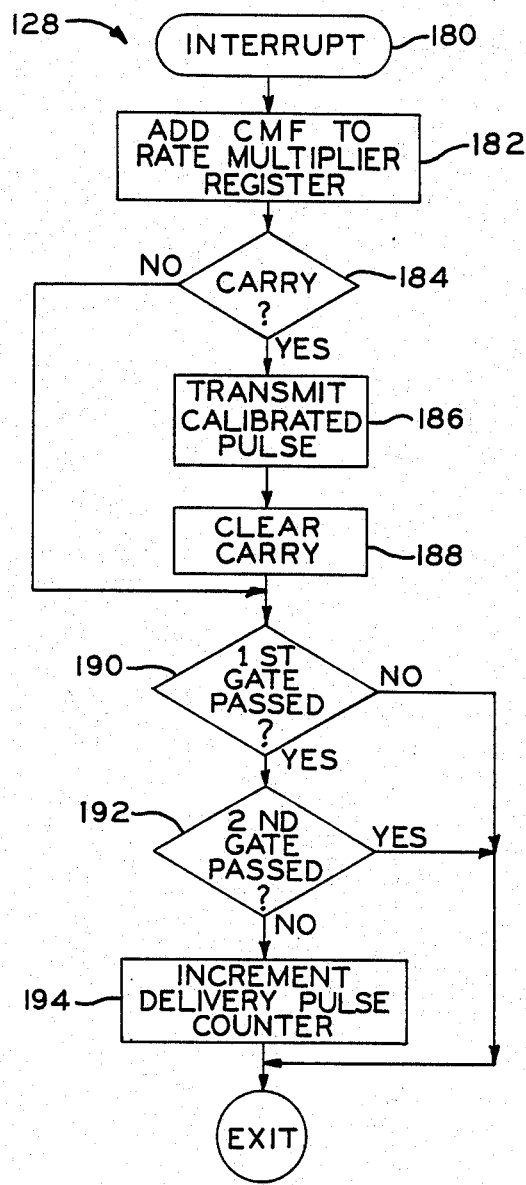

Referring now to FIG. 6, there is shown a preferred embodiment of liquid fuel dispenser 20 wherein a plurality of dispensers are modularly joined. Each dispenser is generally provided with a housing 12 in which is mounted prover assembly 36. It should be appreciated that prover assembly 36, in the disclosed embodiment, comprises a volumetric tube prover having a tube 42 which may be oriented vertically as shown in FIGS. 1 and 5, or at any angular orientation necessary to facilitate mounting within housing 12.

In the preferred embodiment, tube 42 is approximately two inches in diameter and six inches long. However, it is recognized that the dimensions of tube 42 may be varied to provide different volumes and to facilitate mounting of prover assembly 36 within housing 12.

As is the convention with prover tube assemblies, the plunger 44 is in snug fit with the interior wall of tube 42 in the region between switches 46 and 48. After the plunger is carried past switches 46 and 48 to respective ends 47 and 49 of tube 42, the inside dimensions of the tube increase to allow flow of liquid past plunger 44. Upon reversal of the flow of liquid, the plunger is caused once again to enter the narrowed region and travel the length of the tube.

In one aspect of the present invention, calibration means are provided for determining a correction factor by which to modify the output signal of meter 20 for use by display unit 26 to accurately reflect the volume of liquid dispensed. In another aspect of the present invention, means are provided for measuring the output signal of meter 20 during dispensation of a calibrated volume of liquid. Each of the aforementioned calibration means and measuring means encompasses pulser 24, ECU 34, valve 40, and prover assembly 36.

In a further aspect of the present invention, control means are provided by ECU 34 for controlling actuation of valve 40. A yet further aspect of the present invention is the provision of indicating means for indicating the initiation of and completion of dispensation of a calibrated volume of liquid. In the preferred embodiment, such indicating means are provided by prover assembly 36 and ECU 34, whereby ECU 34 receives gated signals from proximity switches 46 and 48 representing the initiation of and completion of dispensation of the calibrated volume of liquid.

Figure 2:
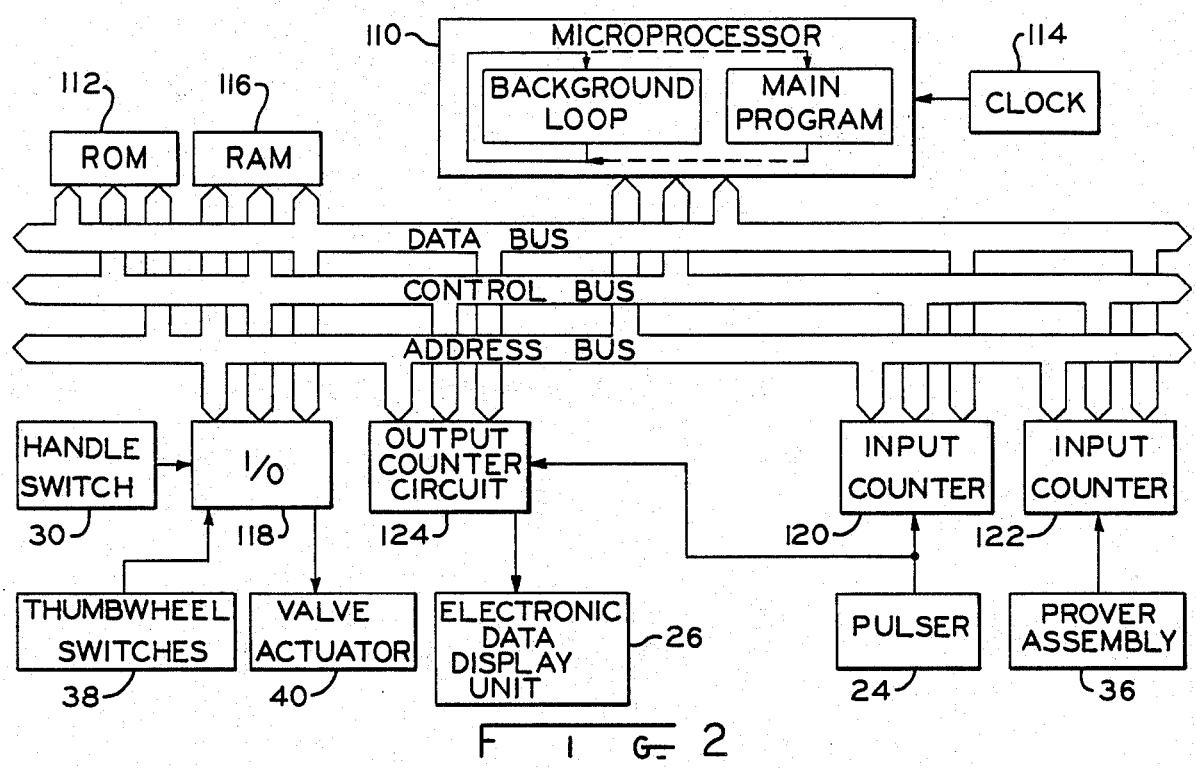
FIG. 2 illustrates a digital computer controlled meter proving and calibration system for supplying calibrated pulses to an electronic register in accord with the principles of the invention.

In the embodiment of the present invention illustrated in FIG. 2, ECU 34 takes the form of a digital computer. The digital computer is standard in form and includes a microprocessor 110 which executes an operating program permanently stored in a read only memory (ROM) 112. Internal to microprocessor 110 are conventional microprocessor elements including counters, registers, accumulators, flags, etc. Such a microprocessor may take the form of an Intel 8051 or Mostek MK3870 microprocessor. Microprocessor 110 receives inputs from a two-phase clock 114 and generates the required timing signals for the remainder of the computer system. Microprocessor 110 further receives an input from a restart circuit which generates a signal for initiating the remaining components of the computer system upon startup of the liquid fuel dispenser such as by operation of a standard power-on switch.

The digital computer also includes a random access memory (RAM) 116 into which data may be temporarily stored and from which data may be read at various address locations as determined in accord with the programs stored in ROM 112. A power control unit (not shown) receives voltage from a power source, i.e., an AC line or a storage battery, and provides regulated power to the various operating circuits in ECU 34.

The input conditions upon which the control of the meter proving and calibration system 28 is based are read under control of the program in ROM 112 via a conventional input/output circuit 118. The up/down discrete input from handle switch 30 is coupled to a discrete input terminal of input/output circuit 118. The BCD information from thumbwheel switches 38 is also accessed through multiple terminals of input/output circuit 118. Furthermore, the output signal to drive the solenoid actuator of valve 40 is provided via input/output circuit 118 which supplies driving current to the valve actuator.

The pulse output of pulser 24 is coupled to a conventional input counter 120 which counts delivery pulses between consecutive gate signals generated by switches 46 and 48. A conventional counter 122 counts the gate signals from switches 46 and 48 under control of the program in ROM 112.

Pulser 24 is also coupled to a conventional rate scaling output counter circuit 124, whereby output delivery pulses generated by pulser 24 are modified by counter circuit 124 in accord with a correction factor determined by execution of the operating program provided by RAM 112. The modified pulse output of counter circuit 124 is supplied to electronic display unit 26. Rate scaling output counter circuit 124 may take the form of an integrated digital circuit, or be performed in software by microprocessor 110, whereby in either case the pulse frequency is decreased by dropping substantially equally spaced pulses in time.

Microprocessor 110, ROM 112, RAM 116, input/output circuit 118, output counter circuit 124, and input counters 120 and 122 are interconnected by an address bus, a data bus, and a control bus. Microprocesssr 110 accesses the various circuits and memory locations in the ROM and RAM via the address bus. Information is transmitted between the circuits via the data bus, and the control bus includes lines such as read/write lines, recess lines, clock lines, etc.

Microprocessor 110 reads the data and controls the operation of output counter circuit 124 and valve 40 by execution of the operating program provided by the ROM 112. Under control of the program, the handle switch, thumbwheel switches, prover assembly, and pulser parameters previously referred to are read and stored in designated locations in RAM 116. Concurrently, calculations are performed for determining the calibration factor by which to modify the delivery pulses for use as input pulses to the electronic display unit to accurately reflect the volume of liquid being dispensed.

When power is first applied to the ECU 34, such as by operation of the standard power switch (not shown) from the off position to the on position, a restart signal from a restart circuit provides initialization of the digital computer. During this initialization, initial values stores in the ROM are entered into ROM designated locations in the RAM, and all counters, flags, and timers are initialized. Thereafter, the program proceeds to execute the operating program stored in the ROM to control performance of the automatic meter proving and calibration system of the present invention.

Figure 3:
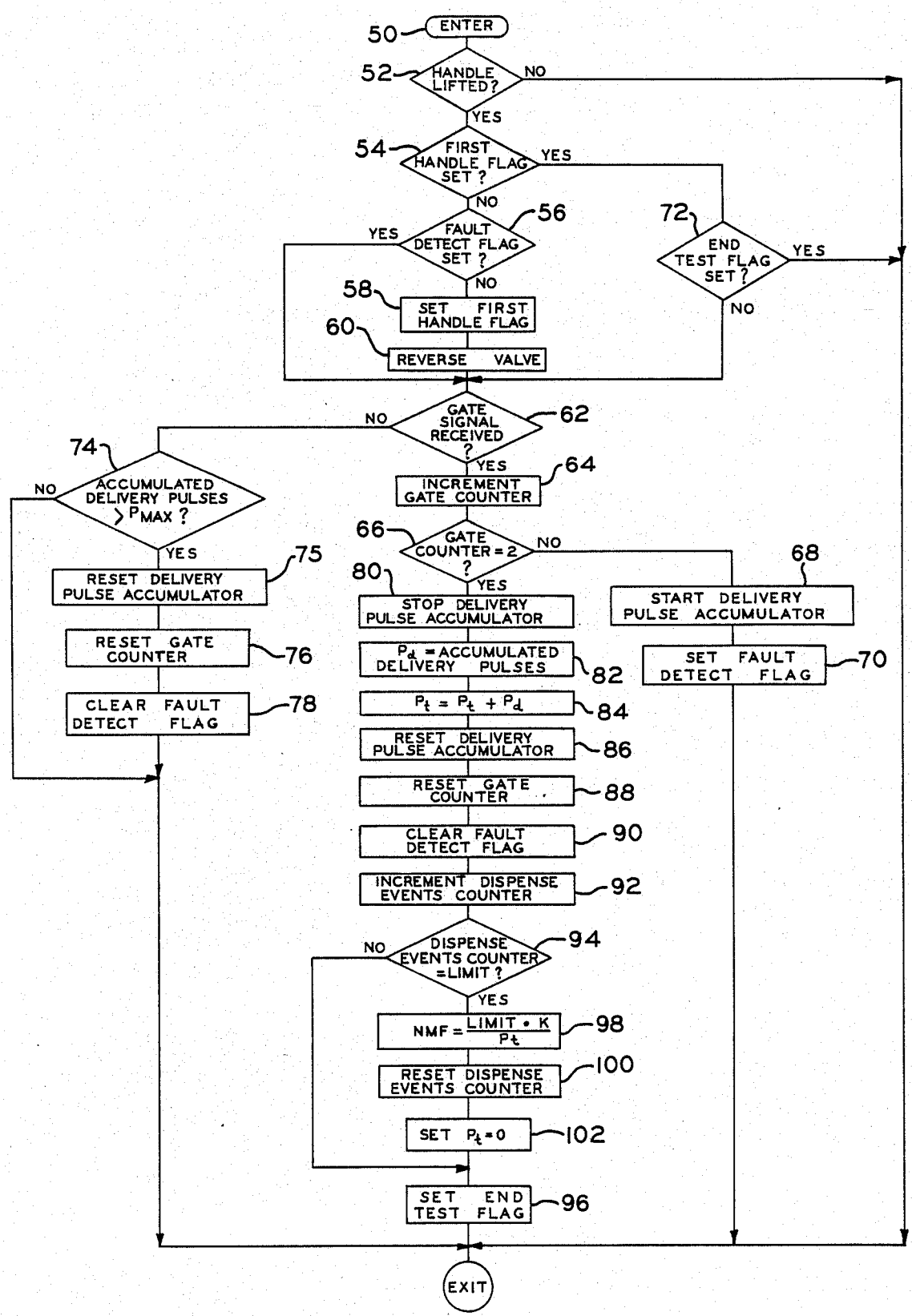
FIG. 3 is a flow diagram illustrative of the operation of the meter proving and calibration system of FIG. 2 according to one embodiment of the present invention.

A closed-loop meter proving and calibration routine that is repeated at timed intervals is illustrated in FIG. 3 for one embodiment of the present invention. The execution rate of the meter proving and calibration routine must be greater than the frequency of pulser 24 at the maximum delivery flow rate to insure accurate counting of delivery pulses and modification of delivery pulses. For instance, in the preferred embodiment where full flow is 25 gallons per minute and pulser 24 operates at approximately 1200 pulses per gallon, an execution rate greater than 30,000 times per minute is necessary.

Referring to FIG. 3, the meter proving and calibration routine is entered at point 50 and proceeds to a step 52 where it determines whether the actuating handle switch 30 is lifted. If the handle is not lifted, the program proceeds to exit the meter proving and calibration routine. If the handle is lifted, the program proceeds to a step 54 where it determines whether the first handle flag is set. If not, the program proceeds to a step 56 where it determines whether a fault detect flag is set. If the fault detect flag is not set, the program proceeds to a step 58 where the first handle flag is set and then to a step 60 where the valve is reversed. Returning to step 56, if the fault detect flag is set, the program proceeds without executing steps 58 and 60.

Next, the program proceeds to a step 62 where it determines whether a gate signal has been received. It should be appreciated that a gate signal is received when the plunger passes either proximity switch 42 or 44 while traveling in either direction. If a gate signal has been received, the program proceeds to a step 64 and increments a gate counter.

Next at a step 66, the program tests to see whether the gate counter is equal to two, representing the end of a prover run. If only the first gate signal has been received, then the gate counter equals one and the program proceeds to a step 68 where the delivery pulse accumulator is started. Next at a step 70, the program sets the fault detect flag before proceeding to exit the meter proving and calibration routine.

On subsequent executions of the meter proving and calibration routine after a first gate signal has been received, the program once again enters at step 50, proceeds through step 52 so long as the handle is lifted, and determines at step 54 that the first handle flag has been set. The program then proceeds to a step 72 and determines whether the end test flag has been set. At this point, the end test point has not been set and, therefore, the program proceeds to step 62 and once again determines whether a gate signal has been received. Until a second gate signal is received, the answer to the query at step 62 is "no" and, therefore, the program would proceed to a step 74 and determine whether the delivery pulses being accumulated by the delivery pulse accumulator exceed a maximum number of delivery pulses $P_{max}$, representing an error condition. The variable $P_{max}$ may be chosen as any number greater than the number of pulses expected to be generated during dispensation of the calibrated volume, for instance, twice the expected number.

If the number of delivery pulses accumulated does not exceed $P_{max}$, the program exits the meter proving and calibration routine. Alternatively, if the number of accumulated delivery pulses does exceed $P_{max}$, the program proceeds through a series of steps 75, 76, and 78. The delivery pulse accumulator is reset at step 75, the gate counter is reset at step 76, and the fault detect flag is cleared at step 78. The program then proceeds to exit the meter proving and calibration routine. An error flag could be set to indicate such an abnormal condition to the dispenser attendant.

Returning to step 62, when the second gate signal is received the program proceeds to step 64 and increments the gate counter before proceeding to step 66 where it determines that the gate counter is now equal to two, representing the completion of a test cycle for a single dispensing event. Accordingly, the program proceeds to a step 80 where the delivery pulse accumulator is stopped. Next at a step 82, a variable $P_d$ is set equal to the number of accumulated delivery pulses. The number of accumulated delivery pulses $P_d$ for the latest dispensing event is added to a running total $P_t$ at a step 84. Next at a step 86, the program resets the delivery pulse accumulator in preparation for the next dispensing event. The program then proceeds to steps 88 and 90, whereat the gate counter is reset and the fault detect flag cleared, respectively.

Next at a step 92, the program increments a dispense events counter representing the number of proving cycles for which the prover has run and delivery pulses have been accumulated. At a step 94, the accumulated count on the dispense events counter is compared to a limit value (LIMIT) representing the number of proving cycles used in calculating an updated meter correction factor. For example, the limit value may be set at 100. If the dispense events counter has not yet reached the limit value the program proceeds to a step 96 where the end test flag is set and then exits the meter proving and calibration routine.

Returning to step 72, on subsequent executions of the meter proving and calibration routine after a meter proving cycle has been completed, i.e., the end test flag has been set, the program proceeds from step 72 to exit the meter proving and calibration routine. Therefore, it can be seen that the meter proving cycle is performed at the beginning of a dispensing event after which time repeated executions of the meter proving and calibration routine proceed through steps 50, 52, 54, and 72 prior to the program exiting the routine.

Returning to step 94, once the count in dispense events counter equals the preset limit of proving cycles desired in calculating a new meter correction factor, the program proceeds to a step 98 where the new meter factor NMF is calculated by dividing the total number of delivery pulses accumulated $P_t$ into the product of the number of dispensing events (LIMIT) and a constant K, where K represents the calibrated number of pulses required by the display unit to display the prover volume of liquid. The new meter factor NMF may be compared with the previous meter factor to determine trends or out of limit conditions, indicating excessive meter wear and possible meter component failure. Typically, the meter factor NMF would be stored in a nonvolatile memory for safekeeping between shutdown and start-up of the fluid dispensing apparatus.

Next, the program proceeds from step 98 to steps 100 and 102, whereat the dispense events counter is reset and the total delivery pulse variable $P_t$ is set equal to zero, respectively. From step 102, the program proceeds to step 96 where the end test flag is set, and then exits the meter proving and calibration routine.

Figure 4:
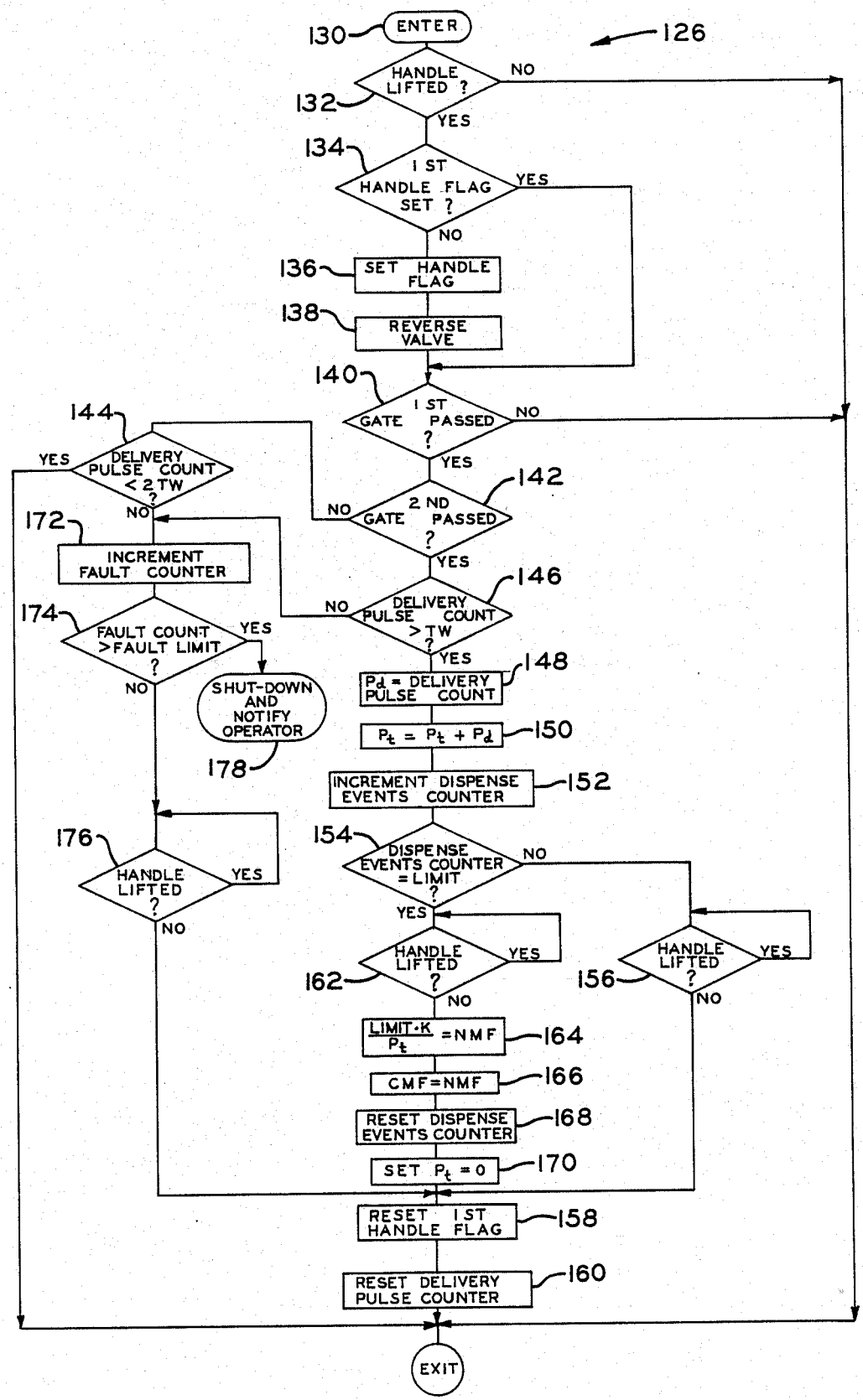
FIGS. 4-5 are flow diagrams illustrative of the operation of the meter proving and calibration system of FIG. 2 according to the preferred embodiment of the present invention.

A closed loop meter proving and calibration routine according to the preferred embodiment of the present invention, including a pulse interrupt subroutine, is illustrated in FIGS. 4 and 5. Referring first to FIG. 4, there is illustrated a main routine 126 that is repeatedly executed by microprocessor 110. At each occurrence of a pulse generated by pulser 24 and received by microprocessor 110, an interrupt is generated so that the microprocessor suspends execution of main routine 126 and executes a pulse interrupt subroutine 128, as shown in FIG. 5. The execution rate of pulse interrupt subroutine 128 must be greater than the frequency of pulser 24 at the maximum delivery flow rate to insure accurate counting of delivery pulses and calibration thereof.

Referring to FIG. 4, main routine 126 is entered at point 130 and proceeds to a step 132 where it determines whether the actuating handle 30 is lifted. If the handle is not lifted, the program proceeds to exit the main routine. If the handle is lifted, the program proceeds to a step 134 where it determines whether the first handle flag is set. If not, the program proceeds to a step 136 where the first handle flag is set and then to a step 138 where the valve is reversed.

Next, the program proceeds to a step 140 where it determines whether a first gate has been passed. On subsequent executions of main routine 126 after the first handle flag has been set, the program once again enters at step 130, proceeds through step 132 so long as the handle is lifted, and determines at step 134 that the first handle flag has been set. The program then proceeds to step 140 to determine whether the first gate has been passed.

If the program determines at step 140 that the first gate has not been passed, the program proceeds to exit the main routine. However, if the first gate has been passed, the program proceeds to a step 142 where it determines whether the second gate has been passed. In the second gate has not yet been passed, the program proceeds to a step 144 where it determines whether the pulse count from a delivery pulse counter in pulse interrupt subroutine 128 has not yet exceeded a value of twice the thumbwheel setting, represented at step 144 as 2TW. It will be appreciated that the value of 2TW represents an arbitrary value greater than the number of pulse counts ever expected prior to the second gate being passed. Thus, if the pulse count is less than 2TW, the program proceeds to exit without registering a fault condition.

Returning to step 142, if the second gate has been passed the program proceeds to a step 146 where it determines whether the pulse count of the delivery pulse counter is greater than the thumbwheel setting, represented at step 146 as TW. This condition is necessary in order that the rate multiplier of the present invention be able to drop pulses produced by the pulser to achieve a calibrated pulse output comprising fewer pulses than generated by the pulser 24 for a given volume of liquid flowing through the meter.

Next at a step 148, a variable $P_d$ is set equal to the number of delivery pulse counts being counted in pulse interrupt subroutine 128. The number of delivery pulse counts $P_d$ for the latest dispensing event is added to a running total $P_t$ at a step 150. Next at a step 152, the program increments a dispense events counter before proceeding to a step 154 where the value in the dispense events counter is compared to a limit value (LIMIT) representing the number of proving cycles used in calculating a new meter factor (NMF). For example, the limit value may be arbitrarily set at 100. If the dispense events counter has not yet reached the limit value, the program proceeds to a step 156 where execution of the program is suspended so long as the handle remains lifted. When the handle is no longer lifted, the program proceeds from step 156 to steps 158 and 160 where the first handle flag and delivery pulse counter are reset, respectively. Following step 160, the program proceeds to exit main routine 126.

Returning to step 154, when the dispense events counter equals the limit value, the program proceeds to a step 162 where it determines whether the handle is lifted. So long as the handle remains lifted, signifying that the dispenser is in operation, the program is suspended at step 162. Step 162 is intended to suspend execution of the meter proving and calibration routine until the current dispensing event is terminated. It is preferred that the steps following step 162, i.e., calculation of a new meter factor, not be performed during a dispensing event. Not only would it seem inappropriate to change the meter factor in the middle of a dispensing event, but the calculation of the meter factor requires valuable microprocessor time otherwise needed to generate calibrated pulses in the pulse interrupt routine.

Returning to step 162, when the program determines that the handle is no longer lifted, the program proceeds to a step 164 where the new meter factor NMF is calculated by dividing the total number of delivery pulses accumulated $P_t$ into the product of the number of dispensing events (LIMIT) and a constant K, where K represents the calibrated number of display unit pulses required for the prover volume of liquid. At a step 166, a variable CMF representing the current meter factor is set equal to the new meter factor NMF.

Once the current meter factor CMF is revised at step 166, the program resets the dispense events counter and sets the variable $P_t$ equal to zero at steps 168 and 170, respectively. The program then proceeds through steps 158 and 160 as earlier described, where the program resets the first handle flag and delivery pulse counter, respectively, prior to exiting the main routine of FIG. 4.

As previously described, the program tests for certain fault conditions at steps 144 and 146. Upon detection of a fault condition at either of these steps, the program proceeds to a step 172 where a fault counter is incremented. Next, at a step 174, the program determines whether the value in the fault counter is greater than an arbitrary fault limit such as 5. If the fault count does exceed the fault limit, the program proceeds to a step 178 where a shutdown procedure is executed and a dispenser operator is notified. Such a shutdown procedure may take the form of a complete shutdown of the dispenser installation or, alternatively, provide for the continued operation of the dispenser employing the current meter factor.

Returning to step 174, if the fault counter does not exceed the fault limit, the program proceeds to a step 176 where execution of main routine 126 is suspended so long as the handle is lifted. When the handle is no longer lifted, signifying the end of a dispensing event, the program proceeds to steps 158 and 160 where the handle flag and delivery pulse counter are reset prior to the program exiting main routine 126.

Referring now to FIG. 5 for a description of the pulse interrupt subroutine 128, the subroutine is entered at a point 180 when ever an interrupt occurs due to the generation of a pulse by pulser 24. Subroutine 128 proceeds to a step 182 where the current meter factor CMF determined in main routine 126 is used as the basis for a conventional rate multiplier. As implemented in software, a conventional rate multiplier consists of a register into which a number representing a scaling factor is initially placed and subsequently added upon each occurrence of an input pulse, so that the carry out of the most significant digit represents the scaled output of the rate multiplier. For example, if a scaling factor of 0.9 were desired, a 9 would initially be placed in the register and 9's subsequently added thereto to produce carries from the single digit position for 9 out of 10 pulse inputs. Greater precision may be accomplished by using a scaling figure having more digits and then taking the carry out of the most significant digit position.

Proceeding to a step 184, pulse interrupt subroutine 128 determines whether a carry has been created from the most significant digit position. If a carry has been generated, the program proceeds to a step 186 where a calibrated pulse is transmitted for use by a display unit 26. The carry is then cleared at a step 188. Returning to step 184, if a carry is not generated from the rate multiplier register then the program proceeds directly to a step 190 without executing steps 186 and 188.

Next at step 190, the program determines whether the first gate is passed. If the first gate is not passed, the program exits the pulse interrupt routine and returns control to main routine 126 program. If the first gate has been passed, the pulse interrupt subroutine proceeds to a step 192 where the program determines whether the second gate has been passed. If the second gate has not been passed, the program proceeds to a step 194 where the delivery pulse counter is incremented. If the program determines that the second gate has been passed at step 192, pulse interrupt subroutine 128 proceeds to exit and return control to main routine 126. Accordingly, it can be seen that steps 190, 192, and 194 of the pulse interrupt subroutine function to increment the delivery pulse counter upon each execution of the pulse interrupt subroutine, so long as the first gate has been passed and the second gate has not yet been passed. In summary, the pulse interrupt subroutine serves the dual function of generating calibrated pulses according to the current meter factor CMF, and accumulating delivery pulse counts during a meter prover run in order for the main routine to determine a new meter factor NMF.

During operation of a gasoline dispenser installation incorporating the present invention, an attendant will typically reset the dispenser at start-up, i.e., the beginning of a business day, and after each dispensing event. When the dispenser is reset, the first handle flag and the end test flag are reset. Likewise, during initialization of computer 26 upon application of power, all flags and counters are initialized. Specifically for the meter proving and calibration routine of FIG. 3, the first handle, fault detect, and end test flags are reset, while the gate counter, dispense events counter, delivery pulse accumulator, and variables $P_d$ and $P_t$ are all set equal to zero.

It should be appreciated that the meter proving and calibration routines described herein represent exemplary methods of performing the automatic meter proving and calibration of the present invention, and that one of ordinary skill in the art of computer programming would be capable of programming a microprocessor from the information contained in the flowcharts of FIGS. 3–5.

In accordance with the principles of the present invention, a calibration factor is automatically calculated at predetermined dispenser operating intervals and used to modify the delivery pulses generated by pulser 24 for use as input pulses to electronic data display unit 26. It is appreciated that display unit 26 has a display constant representing the relationship between the number of input pulses received and the volume displayed by the display unit. Based upon this display constant and the calibrated volume of liquid, a calibrated input signal exists, representing the number of input pulses required by the display unit to display the calibrated volume of liquid. Accordingly, the calibration factor is calculated by accumulating the number of output delivery pulses generated by pulser 24 during dispensation of the calibrated volume of liquid, and dividing that number into the calibrated input signal to determine a multiplier by which all output delivery pulses should be modified before use by display unit 26 to display calibrated volumes.

It should be appreciated that an initial factory set calibration factor may be established and entered into the ROM for use by the dispenser initially until an updated factor is determined, or in the event of loss of the calculated factor from memory. A typical factory set-up may provide for the generation by pulser 24 of approximately 1200 pulses per gallon, whereas the electronic display unit will require only 1000 pulses to display a gallon. Hence, an initial calibration factor of 0.8333 (1000/1200) would be stored in computer memory for use until an automatically calculated value was determined.

In operation of liquid dispenser 10 according to one embodiment, an attendant resets the dispenser by means of reset switch 32 to enable the next dispensing operation. If a predetermined operating interval has been established as each dispensing operation, the first actuation of handle switch 30 causes ECU 34 to issue a signal to valve 40, thus causing valve 40 to reverse the flow of liquid through tube 42. Upon dispensing of liquid by the actuation of nozzle valve 22, flow of liquid through tube 42 causes plunger 44 to move from one end of the tube to the other. When plunger 44 passes a first proximity switch, a first gate signal is generated that initiates accumulation of output delivery pulse from pulser 24 by ECU 34. When plunger 44 passes a second proximity switch, a second gate signal is generated that terminates accumulation of output delivery pulses. The number of pulses accumulated during dispensation of the calibrated volume between proximity switches 46 and 48 of tube 42 are stored by ECU 34.

Calculation of a new meter factor occurs automatically after a predetermined number of prover runs, i.e., number of dispensations of the calibrated volume, at predetermined dispenser operating intervals. As previously described, a prover run may be performed at the start of each dispensing event, or alternatively, after each dispensation of a given volume, for example, every 100 gallons. In the case of the latter, valve 40 would be actuated during dispensing. It should be appreciated that by using a plurality of prover runs to calculate the meter correction factor, accuracy is improved and any errors attributable to meter variations due to flow rate, the direction of travel of plunger 44, and the generation of false pulses are lessened. Also, use of multiple prover runs allows the use of a tube prover small enough to fit within the dispenser housing without sacrificing calibration accuracy.

Lastly, ECU 34 calculates the calibration factor from the total accumulation of pulses during the predetermined number of prover runs and the calibrated input for each dispensation of the calibrated volume multiplied by the predetermined number of prover runs. The meter calibration factor may be used in conjunction with other compensation factors, such as a factor for temperature compensation. Also, as each new calibration factor is calculated, it can be compared to the previous factor and the difference tested for whether abnormal change has occurred.

While the preferred embodiment set forth in the steps of the meter proving and calibration routine provides for performance of a prover run only once during each dispensing event, and calculates new meter factor NMF after a predetermined number of dispensing events, alternative test strategies are contemplated. For instance, the prover run could be initiated at every nth dispensing event, where n represents an interval calculated to increase the life of the valve, which is actuated prior to each prover run. Also, while as a rule accuracy is improved by using more prover runs, i.e., dispensing events, before calculating the new meter factor NMF, it is conceivable that a single run could be used and provide adequate accuracy. Likewise, a plurality of prover runs during a single dispensing event may be employed. Such a dispensing event could occur at preselected intervals, i.e., at each start-up or after each dispensation of a predetermined volume, such as 100 gallons.

While the preferred embodiment provides for actuation of the valve at the first lifting of the handle prior to a dispensing event, it is appreciated that other options exist. For example, the valve may be actuated at the end of each dispensing event when the handle is lowered, or during a dispensing event when the liquid is flowing.

While the predetermined calibration volume of the present invention may be chosen as any volume achievable by, for instance, a prover tube of a size mountable within the liquid dispenser housing, a precise volume is desirable in the case of a meter having a cyclical output. For instance, a reciprocating piston positive displacement meter produces a cyclical output having a frequency dependent upon the number of pistons in the meter. In order to eliminate variations in the meter output attributable to its cyclical output, it is desirable to establish the calibration volume of the prover tube substantially equal to an integer multiple of the volume of one cycle. This is possible to do because variations in the output of the meter caused by mechanical variations and wear ordinarily do not affect the frequency output of the meter. In the case of a rotary vane meter, the meter output does not exhibit a cyclical component and, therefore, any calibration volume would be equally appropriate.

While the present invention has specific application to a flow meter that produces a pulse output by means of a mechanical rotary output and pulser unit, it is appreciated that the invention may also be practiced in conjunction with other types of fluid flow meters whose output can be transformed into a series of digital pulses representative of a given volume of fluid through the meter. For example, a turbine meter or mass flow meter may be designed to produce a pulse output without utilizing a shaft output connectable to a pulser unit. As previously discussed, the calibration apparatus and method of the present invention are directed to compensating for variations in the proportion of meter pulses produced to the volume of liquid dispensed.

It is further to be appreciated that while the illustrated embodiment of the present invention provides for a stand-alone, automatic meter proving and calibration system 28 including a separate digital computer, it is contemplated that system 28 could be incorporated into existing computer hardware dedicated to controlling, for instance, electronic data display unit 26.

It will be appreciated that the foregoing is presented by way of illustration only, and not by way of any limitation, and that various alternatives and modifications may be made to the illustrated embodiment without departing from the spirit and scope of the invention.

What is claimed is:

1. A liquid dispenser apparatus, comprising:
   liquid measuring means for providing an output measurement signal in correlation with a dispensed volume of liquid;
   calibration means for determining a correction factor by which to modify said output measurement signal and generate a corrected signal, said correction factor being automatically determined at predetermined dispenser operating intervals to provide correction of said output measurement signal; and
   means, responsive
   data display means including a register means, responsive to said corrected signal, for indicating said dispensed volume of liquid, whereby said register means accurately indicates said dispensed volume of liquid despite variations in the accuracy of measurement of said liquid measuring means.

2. The liquid dispenser apparatus of claim 1 in which:
   each of said predetermined dispenser operating intervals represents dispensation of a predetermined volume of liquid.

3. The liquid dispenser apparatus of claim 1 in which an operator dispenses a selected volume of liquid during a dispensing event, and further comprising:
   resetting means for resetting said register means to initiate a new dispensing event, each of said predetermined integrals representing the completion of a predetermined number of dispensing events.

4. The liquid dispenser apparatus of claim 1 and further including a housing, said calibration means being enclosed in said housing.

5. The liquid dispenser of claim 1 in which:
   said calibration means comprises a liquid calibration chamber of a predetermined calibration volume.

6. The liquid dispenser of claim 5 in which:
   said calibration means further comprises means for measuring said output measurement signal during dispensation of a volume of liquid equal to said predetermined calibration volume.

7. The liquid dispenser of claim 6 in which:
   said data display means indicates a predetermined volume of dispensed liquid in response to a predetermined correct signal, said data display means being calibrated to indicate a predetermined calibration volume in response to a calibrated input signal therefor; and
   said calibration means further comprises computing means for computing said correction factor by determining the ratio of said calibrated input signal to said output measurement signal during dispensation of a volume of liquid equal to said predetermined calibration volume, said calibration means modifying said output measurement signal by multiplying said output measurement signal with said correction factor.

8. The liquid dispenser of claim 5 in which:
   said liquid calibration chamber includes a calibration barrel having a moveable piston therein and being connectable in series fluid flow with said liquid measuring means, whereby said dispensed volume of liquid passes through both said liquid measuring means and said calibration barrel.

9. The liquid dispenser of claim 8 in which said movable piston is bi-directional in operation, and further comprising:
   valve means actuable by said calibration means for reversing the flow of dispensed liquid through said calibration barrel.

10. The liquid dispenser of claim 9 in which:
    said valve means is automatically actuated during each of said dispensing events.

11. In a liquid dispensing apparatus including a housing, a mechanical flow measuring means in said housing for producing a flow indicating output signal in response to the passage of liquid therethrough, delivery pulser means responsive to said flow output signal for producing a plurality of output delivery pulses whose number has a predetermined proportional relationship to the volume of said dispensed, and data display means responsive to input pulses for indicating a dispensed volume of liquid in direct proportion to the number of input pulses received, wherein said ratio of output delivery pulses produced to the dispensed volume of said liquid varies over time according to mechanical wear and variations of said measuring means, a method of calibrating said data display means to compensate for said variations in the ratio of output delivery pulses produced to the dispensed volume of liquid, comprising the steps of:
  providing an indicating means within said housing for indicating the initiation of and completion of dispensation of a predetermined calibration volume of liquid, the number of input pulses necessary for said data display means to indicate said predetermined calibration volume being a known constant;
  counting said output delivery pulses during dispensation of liquid beginning with said initiation indication and ending with said completion indication;
  comparing said known constant to the count of output delivery pulses to determine a meter correction factor;
  modifying said plurality of output delivery pulses by said meter correction factor for use as input pulses to said data display means.

12. The calibration method of claim 11 in which:
said indicating means includes a calibrated barrel connected in series liquid flow with said measuring means, a movable piston in said barrel, and two proximity switches spaced apart on said barrel, one of said proximity switches providing said initiation indication an the other of said proximity switches providing said completion indication in response to movement of said piston through said barrel during dispensation of liquid.

13. The calibration method of claim 12, and further comprising the step of:
providing a valve means for reversing flow of liquid through said calibrated barrel without changing the direction of liquid flow through said measuring means.

14. The calibration method of claim 13 and further comprising the step of:
actuating said valve means at predetermined dispensing intervals to reverse flow of liquid through said calibrated barrel.

15. The calibration method of claim 14 in which:
each of said predetermined intervals of said actuating step represents dispensation of a predetermined calibration volume of liquid.

16. The calibration method of claim 14 in which:
said liquid dispenser apparatus further comprises resetting means for resetting said data display means to initiate a new dispensing event, each of said predetermined dispensing intervals of said actuating step representing the completion of a predetermined number of dispensing events.

17. The calibration method of claim 11 and further comprising the step of:
enabling said indicating means to dispense said predetermined calibration volume of liquid in a predetermined dispensing interval.

18. The calibration method of claim 17 in which:
said predetermined dispensing interval comprises a predetermined number of dispensing events;
said liquid dispenser apparatus further comprising resetting means for resetting said data display means to initiate a new dispensing event.

19. The calibration method of claim 11 in which:
said step of counting output delivery pulses is performed for a plurality of dispensations of said predetermined calibration volume.

20. A liquid dispenser apparatus comprising:
manually operable nozzle valve means for controlling dispensing of a liquid;
pump means for supplying a flow of liquid to said nozzle valve means;
mechanical flow meter means connected in circuit between said pump means and nozzle valve means for producing a meter output signal which is proportional to a dispensed volume of liquid passing through said flow meter means, said dispensed volume of liquid for a given meter output signal being variable over time due to mechanical wear and variations of said flow meter means;
delivery pulser means, responsive to said meter output signal of said flow meter means, for producing a plurality of output delivery pulses whose number is directly proportional to said meter output signal;
value display means, responsive to display input pulses, for displaying a volume value in direct proportion to the number of display input pulses received, said proportion representing a display constant;
calibration means, including a calibration chamber of a predetermined calibration volume, for indicating dispensation of a volume of liquid substantially equal to said calibration volume;
counting means, responsive to a signal from said calibration means, for counting the output delivery pulses produced during dispensation of a volume of liquid substantially equal to said calibration volume; and
computer means for automatically computing a calibration factor based upon the number of delivery pulses counter during dispensation of said calibration volume of liquid, said display constant, and the displayed volume value of said dispensed calibration volume, the output delivery pulses produced during dispensation of a volume of liquid being modified by said computed calibration factor to display input pulses for delivery to said value display means, whereby said meter means is automatically compensated for variations in said meter output signal caused by mechanical wear and variations of said flow meter means, and whereby said value display means reflects an accurate value for the volume of liquid dispensed.

21. The liquid dispenser apparatus of claim 20 and further comprising:
calibration valve means for inserting said calibration chamber in series flow with said flow meter means.

22. The liquid dispenser apparatus of claim 21 in which:
said calibration valve means is a four-way, two-position valve operable in a first position to cause liquid to flow through said calibration chamber in a first direction and operable in a second position to cause liquid to flow through said calibration chamber in a second direction opposite to said first direction.

23. The liquid dispenser apparatus of claim 20 in which:
said calibration chamber comprises a bi-directional prover tube having a movable piston in said tube and two proximity switches spaced apart on said tube, said calibration volume being defined by the volume of liquid flowing through said tube when liquid causes said piston to move from a position adjacent one of said proximity switches to a position adjacent the other of said proximity switches.

24. The liquid dispenser apparatus of claim 23 and further comprising:
calibration valve means for reversing the flow of liquid through said tube without changing the direction of flow through said flow meter means.

25. The liquid dispenser apparatus of claim 24 and further comprising:
unitary housing means for housing said flow meter means, said pulser means, said prover tube, and said calibration valve means, said prover tube and calibration valve means being connected in liquid flow communication between said pump means and said flow meter means.

26. The liquid dispenser apparatus of claim 24 in which:
said calibration means includes control means for controlling actuation of said calibration valve means at predetermined dispenser operating intervals.

27. The liquid dispenser apparatus of claim 23 in which:
each of said proximity switches provides a gating signal to said calibration means whenever said plunger is in a position adjacent to said respective proximity switch, whereby, when flow of liquid causes said plunger to move from a position adjacent one proximity switch to a position adjacent the second proximity switch, said calibration means indicates dispensation of a volume of liquid substantially equal to said calibration volume.

28. The liquid dispenser apparatus of claim 20 in which:
said computer means computes a calibration factor based upon the number of pulses accumulated during a plurality of dispensations of said calibration volume.

29. The liquid dispenser apparatus of claim 28 and further comprising:
reset means for resetting said value display means to reflect a new volume of liquid dispensed, and for resetting said calibration means to initiate dispensation of a volume of liquid substantially equal to said calibration volume, whereby dispensation of a calibration volume occurs after each operation of said reset means.

30. The liquid dispenser apparatus of claim 20 in which:
said flow meter means is a reciprocating piston positive displacement meter having a cyclical output, said calibration volume being an integer multiple of a single cycle volume of said cyclical output.

31. The liquid dispenser apparatus of claim 20 in which the volume of said calibration chamber is experimentally determinable and further comprising:
volume indicating means for indicating to said computer the experimentally determined volume of said calibration chamber.

32. The liquid dispenser apparatus of claim 31 in which:
said volume indicating means comprises manually selectable thumbwheel switches.

33. A liquid fuel dispensing apparatus comprising:
a housing;
liquid volume measuring means in said housing for providing a delivery signal corresponding to a dispensed volume of fuel;
display means responsive to said delivery signal for displaying a dispensed volume of fuel;
proving means in said housing for proving the amount of fuel dispensed during a predetermined number of dispensing operations of said apparatus and for providing a correction signal indicative of the difference between said displayed dispensed volume of fuel and the actual volume of dispensed fuel; and
means for calibrating said display means based on said correction signal to cause said display means to indicate the actual volume of dispensed fuel.

34. The liquid dispensing apparatus according to claim 33 wherein said delivery signal comprises a stream of delivery pulses, each delivery pulse representing a predetermined volume of dispensed fuel, said apparatus further including counting means to count said delivery pulses for a dispensed volume of fuel.

35. The liquid fuel dispensing apparatus according to claim 34 wherein said proving means includes means for counting said delivery pulses provided by said liquid volume measuring means during dispensation of a predetermined volume of fuel.

36. The liquid dispensing apparatus of claim 35 wherein said predetermined volume of fuel is measured by flowing said fuel through a calibration chamber connected in circuit with said liquid measuring means.

* * * * *

UNITED STATES PATENT AND TRADEMARK OFFICE
CERTIFICATE OF CORRECTION

PATENT NO. : 4,831,866

DATED : May 23, 1989

INVENTOR(S) : Maurice J. Forkert et al

It is certified that error appears in the above-identified patent and that said Letters Patent is hereby corrected as shown below:

Claim 1, Col. 15, line 68, delete "means, responsive";
Claim 7, Col. 16, line 32, change "correct" to --corrected--;
Claim 11, Col. 16, line 68, after "said" insert --liquid--;
Claim 12, Col. 17, line 32, change "an" to --and--;
Claim 20, Col. 18, line 38, change "counter" to --counted--.

Signed and Sealed this

Thirteenth Day of February, 1990

Attest:

JEFFREY M. SAMUELS

*Attesting Officer*   *Acting Commissioner of Patents and Trademarks*